United States Patent
Law et al.

(10) Patent No.: US 9,241,558 B2
(45) Date of Patent: Jan. 26, 2016

(54) ELECTRONIC DEVICE CAMERA CASE AND METHOD OF PROVIDING THE SAME

(71) Applicant: Belkin International, Inc., Playa Vista, CA (US)

(72) Inventors: Henry Law, Orange, CA (US); Xin Fu, Hong Kong (CN)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 14/521,937

(22) Filed: Oct. 23, 2014

(65) Prior Publication Data

US 2015/0108186 A1   Apr. 23, 2015

Related U.S. Application Data

(60) Provisional application No. 61/894,836, filed on Oct. 23, 2013.

(51) Int. Cl.
*A45F 5/00* (2006.01)
*A45C 11/00* (2006.01)
*G03B 17/56* (2006.01)

(52) U.S. Cl.
CPC ............... *A45F 5/00* (2013.01); *G03B 17/568* (2013.01); *A45C 2011/003* (2013.01)

(58) Field of Classification Search
CPC .................. G03B 17/568; A45C 2011/003
See application file for complete search history.

(56) References Cited

U.S. PATENT DOCUMENTS

| 2009/0181729 A1 | 7/2009 | Griffin, Jr. et al. | |
| 2010/0300909 A1 | 12/2010 | Hung | |
| 2012/0112031 A1* | 5/2012 | Gormick | A45C 11/00 248/371 |
| 2013/0313142 A1* | 11/2013 | Wen | A45C 11/00 206/320 |
| 2014/0061069 A1* | 3/2014 | Westrup | G06F 1/1628 206/37 |
| 2015/0108186 A1* | 4/2015 | Law | A45F 5/00 224/191 |

FOREIGN PATENT DOCUMENTS

| JP | 2002-365697 | 12/2002 |
| KR | 20-2010-0004120 | 4/2010 |

(Continued)

OTHER PUBLICATIONS

International Search Report and Written Opinion for PCT/US2014/062022 dated Jan. 27, 2015.

(Continued)

*Primary Examiner* — W B Perkey
(74) *Attorney, Agent, or Firm* — Bryan Cave LLP

(57) ABSTRACT

A case can include a front cover and a back cover. The back cover can include a back edge, a device support assembly including a main device region and a tab, and a flap including an exposure region and a tab region. The case can include a top edge and a bottom edge. The back cover can be configured to be removably coupled to a first electronic device. The back cover can be configured to be removably coupled to a second electronic device when the first electronic device is not coupled to the back cover. The first electronic device can include a first camera lens and first dimensions. The second electronic device can include a second camera lens and second dimensions different from the first dimensions of the first electronic device. The flap can be configured to be placed in an exposed configuration and a closed configuration. Other embodiments are provided.

21 Claims, 15 Drawing Sheets

(56) References Cited

FOREIGN PATENT DOCUMENTS

| | | |
|---|---|---|
| KR | 10-2013-0037022 | 4/2013 |
| KR | 20-0468388 | 8/2013 |

OTHER PUBLICATIONS

Apple Accessories Shop.com, "Griffin Survivor Case for iPod Touch4", Sep. 10, 2013, <appleaccessoriesshop.com/griffin-survivor-case-for-ipod-touch4?filter_name=griffin survivor case&p.=2>.

* cited by examiner

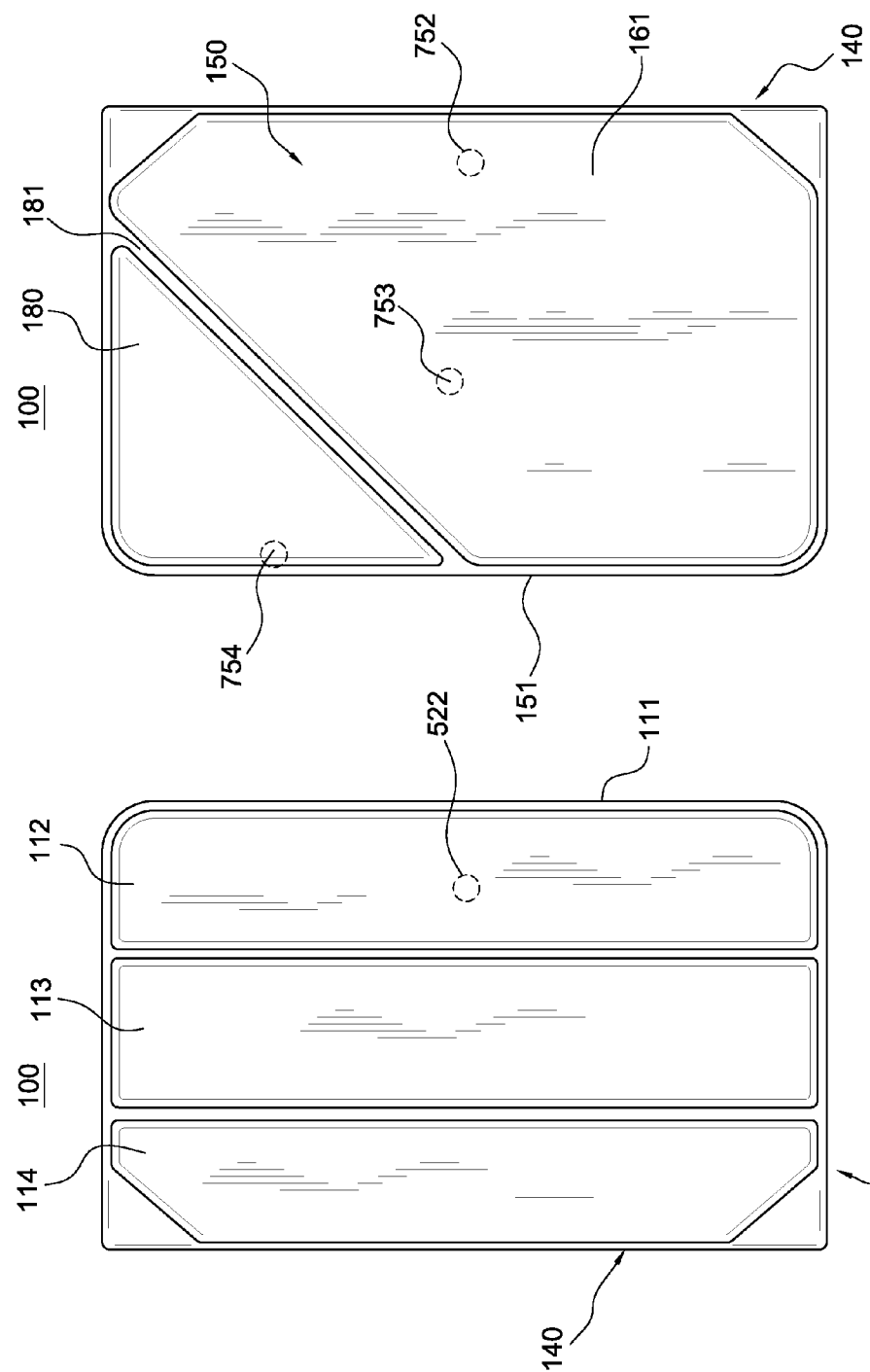

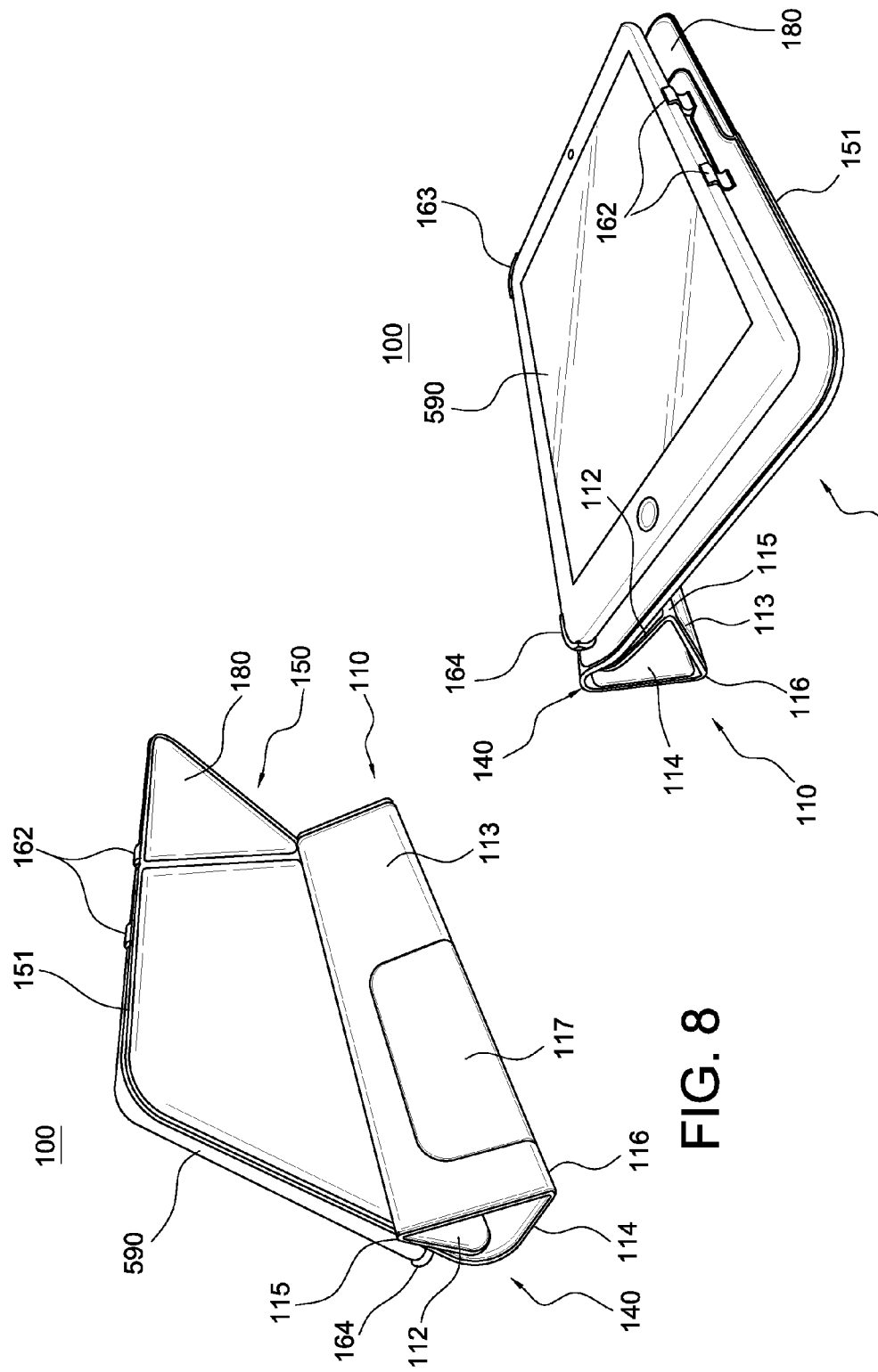

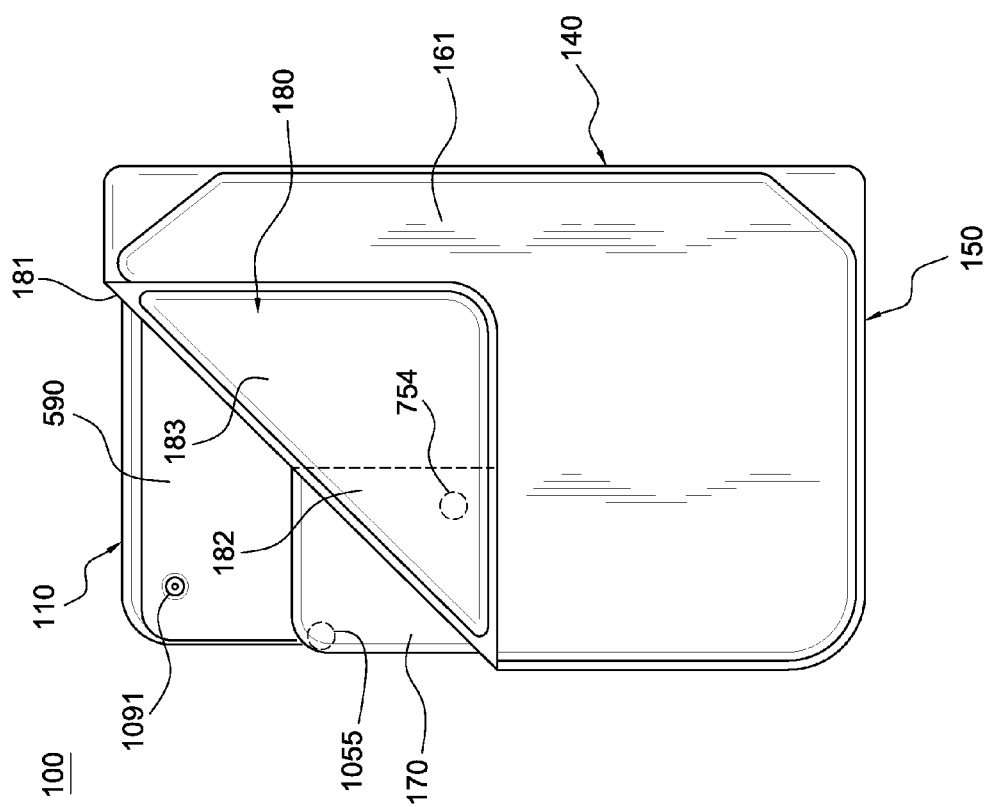

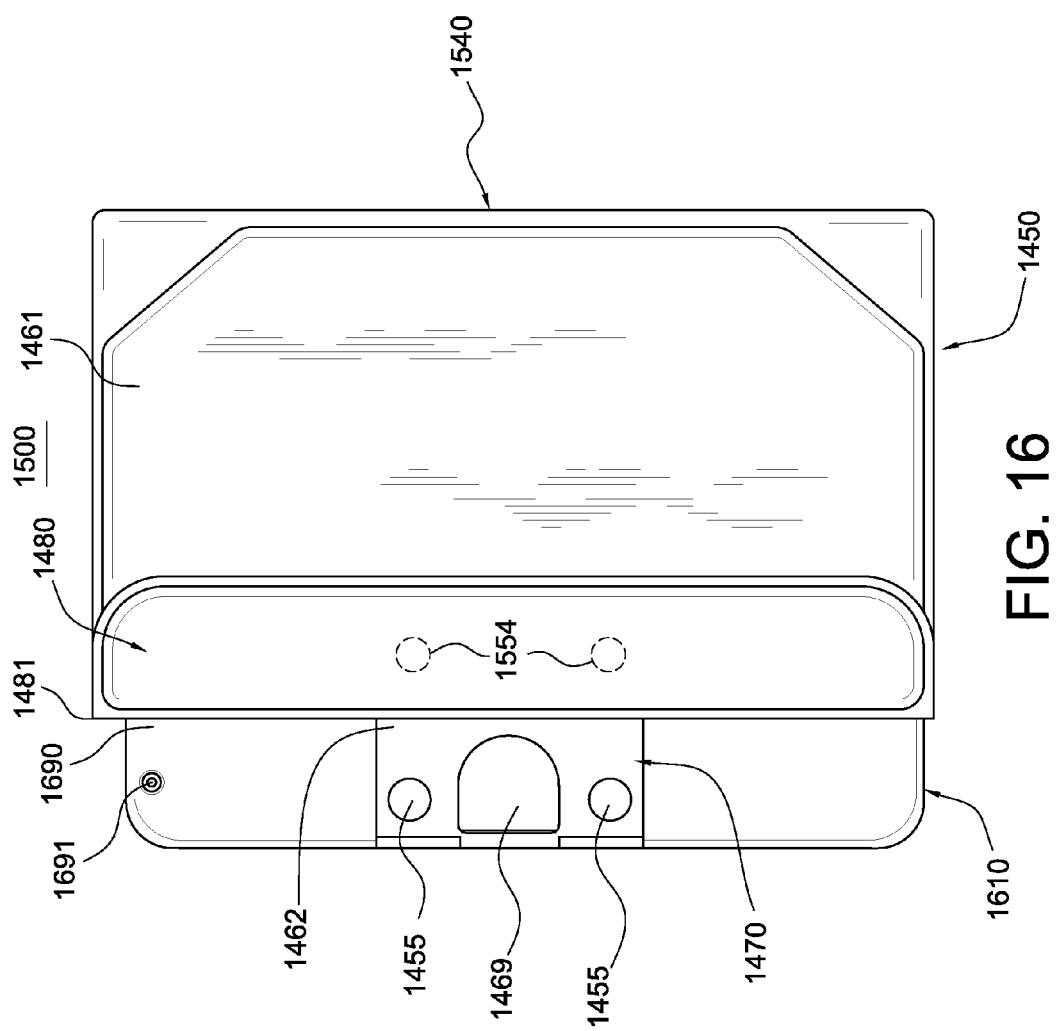

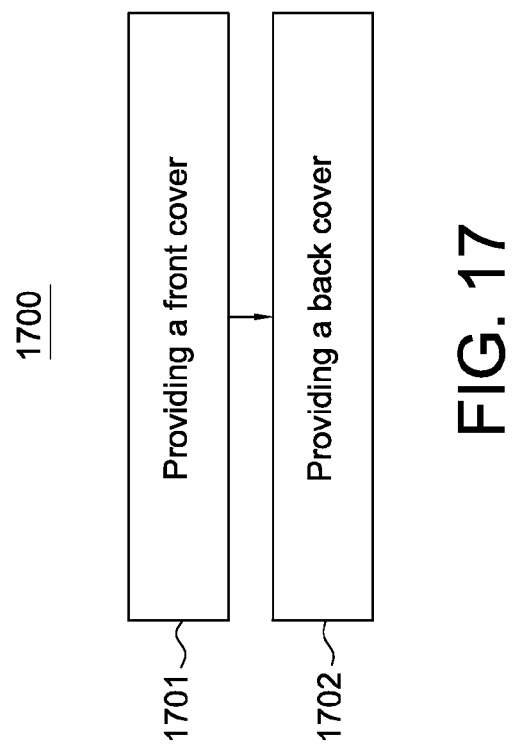

ELECTRONIC DEVICE CAMERA CASE AND METHOD OF PROVIDING THE SAME

CROSS-REFERENCE TO RELATED APPLICATIONS

This application claims the benefit of U.S. Provisional Application No. 61/894,836, filed Oct. 23, 2013. U.S. Provisional Application No. 61/894,836 is incorporated herein by reference in its entirety.

TECHNICAL FIELD

This disclosure relates generally to cases for electronic devices, and related more particularly to cases that are configured for supporting an using electronic devices having cameras.

BACKGROUND

Advancing technology has made portable electronic devices increasingly popular and has given such electronic devices an ever-increasing array of capabilities. Some electronic devices, such as smartphones and tablet computers, often include one or more cameras. These electronic devices can have various different shapes and sizes, and the cameras can be located at various different positions on the electronic devices. Electronic devices are often used with cases. Yet various electronic devices can be difficult to use or even incompatible with various cases due to differences in shape, size, and/or camera position.

BRIEF DESCRIPTION OF THE DRAWINGS

To facilitate further description of the embodiments, the following drawings are provided in which:

FIG. 6 illustrates a top view of the case of FIG. 1 in a closed cover configuration, showing the front cover;

FIG. 7 illustrates a bottom view of the case of FIG. 1 in a closed cover configuration, showing the back cover;

FIG. 8 illustrates a bottom side perspective view of the case of FIG. 1 holding the tablet computing device in a viewing configuration;

FIG. 9 illustrates a front side perspective view of the case of FIG. 1 holding the tablet computing device in a typing configuration;

FIG. 10 illustrates a bottom view of the case of FIG. 1 in a closed cover configuration with the flap in an exposed configuration;

FIG. 16 illustrates a bottom view of the case of FIG. 15 holding a tablet computing device, with the flap in an exposed configuration; and FIG. 17 illustrates a flow chart for a method of providing an case, according to another embodiment.

Figure 1:
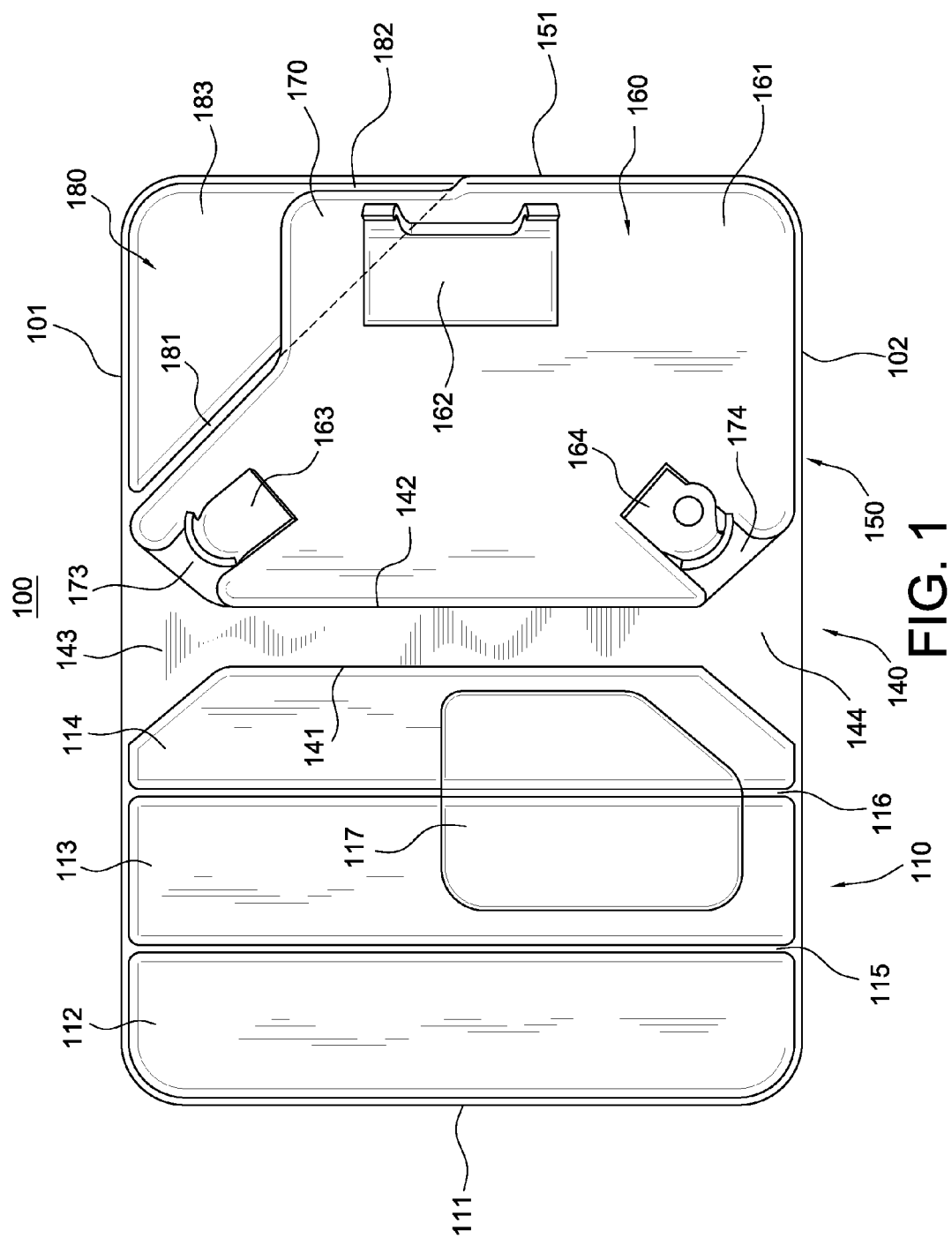
FIG. 1 illustrates a top view of a case in an open, unfolded configuration, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a case. The case can include a front cover and a back cover. The back cover can include a back edge, a device support assembly including a main device region and a tab, and a flap including an exposure region and a tab region. The case can include a top edge and a bottom edge. The back cover can be configured to be removably coupled to a first electronic device. The back cover can be configured to be removably coupled to a second electronic device when the first electronic device is not coupled to the back cover. The first electronic device can include a first camera lens and first dimensions. The second electronic device can include a second camera lens and second dimensions different from the first dimensions of the first electronic device. The flap can be configured to be placed in an exposed configuration and a closed configuration.

A number of embodiments include a method of providing a case. The method can include providing a front cover. The method also can include providing a back cover. The back cover can include a back edge, a device support assembly including a main device region and a tab, and a flap including an exposure region and a tab region. The case can include a top edge and a bottom edge. The back cover can be configured to be removably coupled to a first electronic device. The back cover can be configured to be removably coupled to a second electronic device when the first electronic device is not coupled to the back cover. The first electronic device can include a first camera lens and first dimensions. The second electronic device can include a second camera lens and second dimensions different from the first dimensions of the first electronic device. The flap can be configured to be placed in an exposed configuration and a closed configuration.

Embodiments of a tablet computer camera case can be configured to hold and secure multiple different tablet computing devices, such as the iPad® or iPad Mini®, developed and sold by Apple, Inc., of Cupertino, Calif.; the Kindle®, developed and sold by Amazon.com, Inc.; and/or the Samsung Galaxy Tab®, developed and sold by Samsung Group; among other tablet computing devices, which can each have different dimensions and/or features. Embodiments of the tablet computer camera case can be configured to allow use of a camera of the tablet computing device while the tablet computing device is held by the tablet computer camera case, and/or to protect the camera when not in use. Embodiments of the tablet computer camera case can provide handles and/or grips to facilitate use of the camera while the tablet computing device is held by the tablet computer camera case in a landscape or portrait orientation. Embodiments of the tablet computer camera case can be configured to allow the tablet computing device to be used in a viewing configuration and/or a typing configuration.

Turning to the drawings, FIG. 1 illustrates a top view of a tablet computer camera case 100 in an open, unfolded configuration with a tablet computing device removed, showing the inner surfaces of the covers of tablet computer camera case 100. Tablet computer camera case 100 is merely exemplary, and embodiments of the tablet computer camera case are not limited to the embodiments presented herein. The tablet computer camera case can be employed in many different embodiments or examples not specifically depicted or described herein. In many embodiments, tablet computer camera case 100 can include a front cover 110, a back cover 150, and/or a spine 140. Back cover 150 can have dimensions similar to or slightly larger than a tablet computing device, and can extend, in certain embodiments, from a back edge 151 to a back spine edge 142 and/or from a top edge 101 to a bottom edge 102. Front cover 110 can have dimensions similar to back cover 150 and can, in a number of embodiments, extend from a front edge 111 to a front spine edge 141 and/or from top edge 101 to bottom edge 102. Spine 140 can extend from front spine edge 141 to back spine edge 142 and/or from top edge 101 to bottom edge 102. Spine 140 can have a dimension from front spine edge 141 to back spine edge 142 similar to or slightly larger than the thickness of a tablet computing device, which can allow tablet computer camera case 100 to close in a closed cover configuration, as shown in FIGS. 6-7.

In many embodiments, the inner and/or outer layers of front cover 110, back cover 150, and/or spine 140 can be made of leather (e.g., split leather), grip suede, polypropylene, polyethylene, nylon, fabric, or another suitable material. In many embodiments, the inner and/or outer layers of front cover 110, back cover 150, and/or spine 140 can each be made of the same or different material.

In various embodiments, front cover 110 can include an outer segment 112, a middle segment 113, and an inner segment 114, each of which can extend from top edge 101 to bottom edge 102. In many embodiments, outer segment 112 can extend from front edge 111 to an outer segment hinge 115. Middle segment 113 can extend from outer segment hinge 115 to an inner segment hinge 116. Inner segment 114 can extend from inner segment hinge 116 to front spine edge 141. In some embodiments, outer segment 112, middle segment 113, and/or inner segment 114 can include stiffener layers between the inner and outer layers of front cover 110. The stiffener layers can be made of a suitable rigid or semi-rigid material, such as cardboard, acrylonitrile butadiene styrene (ABS), plastic, foam, or another suitable material. In certain embodiments, the layers can be stitched together or attached with an adhesive. In a number of embodiments, outer segment hinge 115 and/or inner segment hinge 116 do not include stiffener layers, so as to allow front cover 110 to fold flexibly at outer segment hinge 115 and/or inner segment hinge 116.

In various embodiments, front cover 110 can include a front cover grip 117. In some embodiments, front cover grip 117 can extend fully or partially across front cover 110. For example, front cover grip 117 can extend across a portion of middle segment 113, inner segment 114, and inner segment hinge 116, as shown in FIG. 1. In certain embodiments, front cover grip 117 can be located closer to bottom edge 102 than top edge 101. In a number of embodiments, front cover grip 117 can be made of a soft, non-slip, and/or high-texture material, such as high-texture polyurethane, high-grain leather, rubber, etc., which can provide a secure grip when front cover 110 is folded into a handle, as shown in FIGS. 8-9, and/or can provide a soft surface so as to not scratch or otherwise mar the screen of the tablet computing device when tablet computer camera case 100 is in a closed cover configuration and front cover grip 117 is in contact with the screen of the tablet computing device.

In many embodiments, spine 140 can include inner and/or outer layers made of the same or different materials as front cover 110. In many embodiments, spine 140 does not include any stiffener layers, such that spine can bend flexibly between front spine edge 141 and back spine edge 142. In other embodiments, spine 140 can include a stiffener layer between front spine edge 141 and back spine edge 142 such that spine 140 can still bend at front spine edge 141 and back spine edge 142.

In many embodiments, tablet computer camera case 100 can include a top flexible spine corner 143 at or proximate to the intersection of top edge 101 and spine 140, and/or a bottom flexible spine corner 144 at or proximate to the intersection of bottom edge 102 and spine 140. In certain embodiments, top flexible spine corner 143 can include corner portions of front cover 110 and/or back cover 150 that are proximate to the intersection of top edge 101 and spine 140. In certain embodiments, bottom flexible spine corner 144 can include corner portions of front cover 110 and/or back cover 150 that are proximate to the intersection of bottom edge 102 and spine 140. In certain embodiments, for example, the stiffener layer at each end of inner segment 114 next to front spine edge 141 does not extend to the corners at the intersection(s) of front spine edge 141 with top edge 101 and/or bottom edge 102, as shown in FIG. 1. In many embodiments, the stiffener layer can form approximately a 45 degree angle at each of the corners with respect to front spine edge 141, top edge 101 and/or bottom edge 102. In many embodiments, stiffener layers in back cover 150 similarly do not extend to the corners at the intersection(s) of back spine edge 142 with top edge 101 and/or bottom edge 102.

Figure 13:
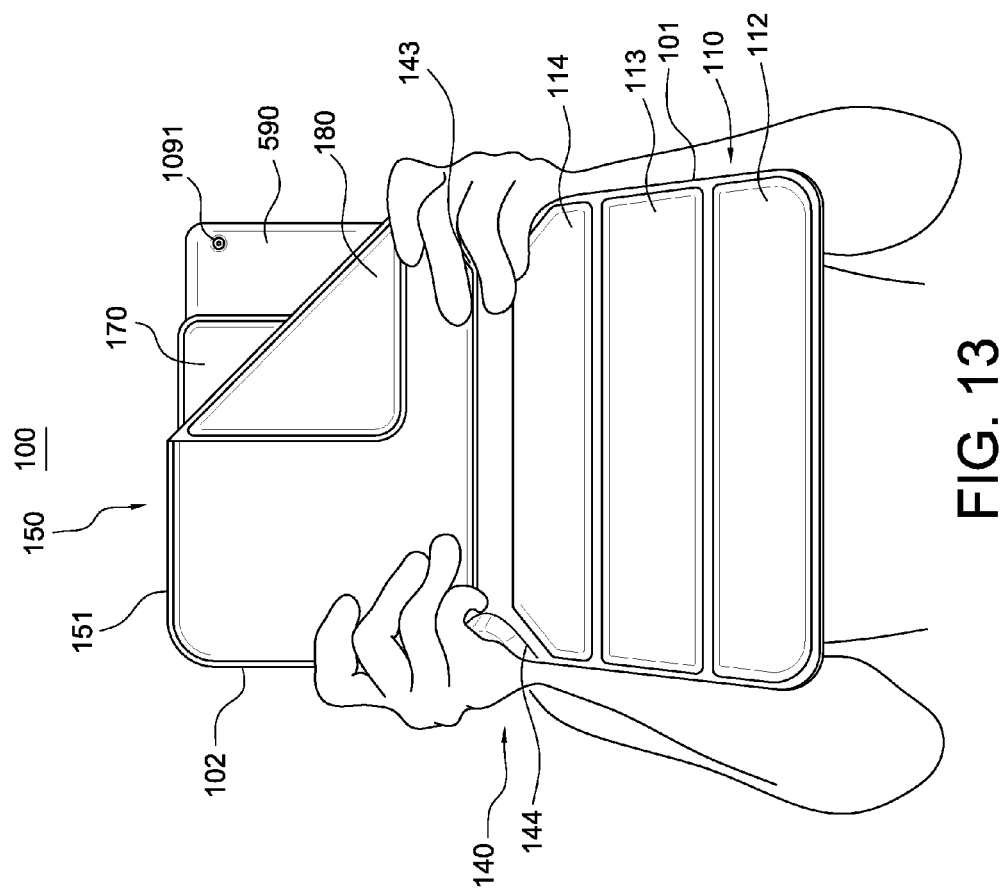
FIG. 13 illustrates a rear view of the case of FIG. 1 being used in another configuration to take pictures in a landscape orientation.

In many embodiments, top flexible spine corner 143 and/or bottom flexible spine corner 144 can include inner and/or outer layers, as described above, and can be made of the same or different materials of front cover 110. In other embodiments, top flexible spine corner 143 and/or bottom flexible spine corner 144 can be made of a flexibly collapsible material such as neoprene, thermoplastic elastomer (TPE), or rubber. Top flexible spine corner 143 and/or bottom flexible spine corner 144 can provide a flexible structural indentation in top edge 101 and/or bottom edge 102 that can advantageously provide for improved handling and/or grip of tablet computer camera case 100 during use, as shown in FIG. 13 and described below in further detail.

Figure 5:
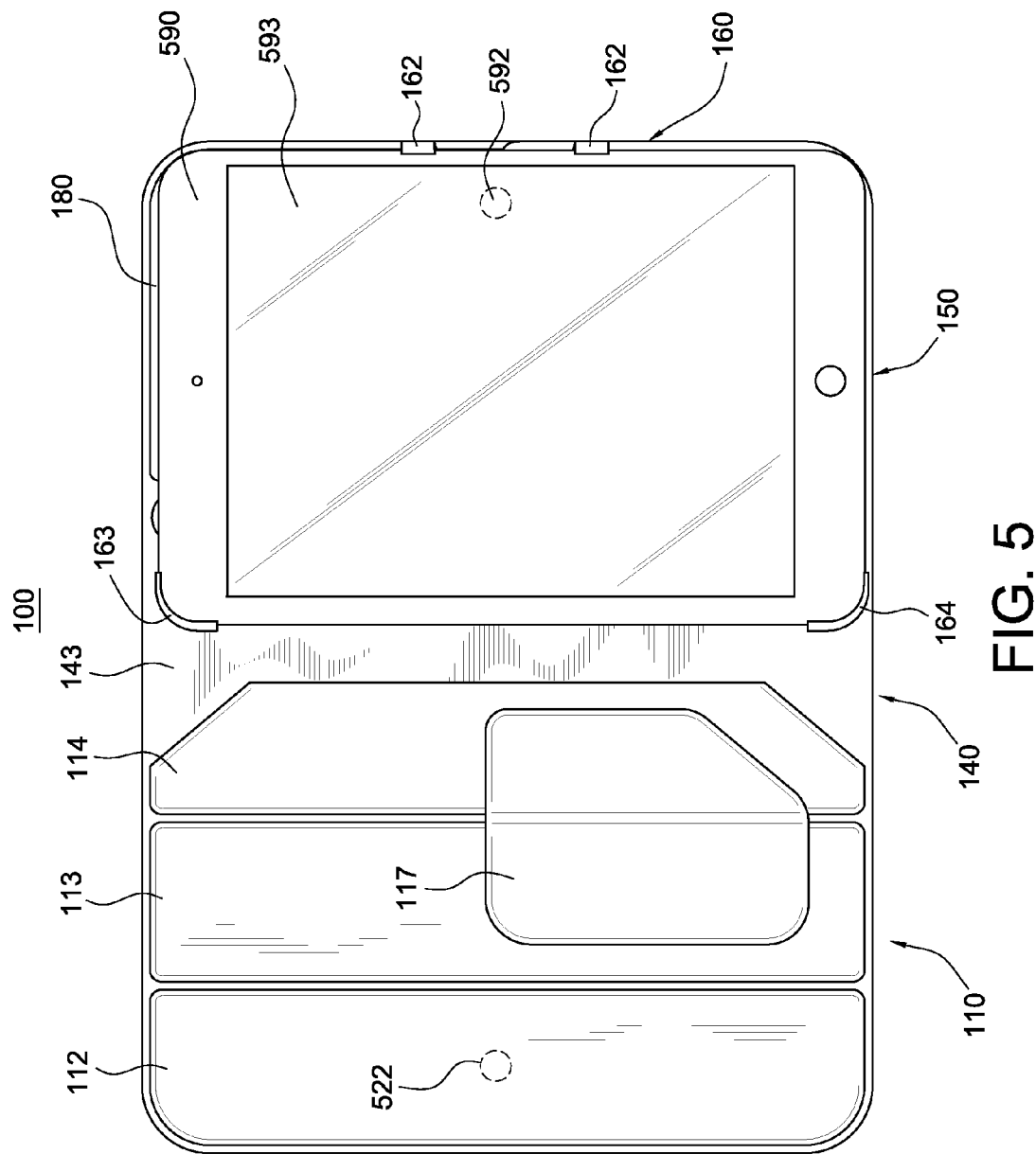
FIG. 5 illustrates a top view of the case of FIG. 1 in an open, unfolded configuration with a tablet computing device being held by the device support assembly.

In some embodiments, back cover 150 can include a device support assembly 160 and/or a flap 180. In many embodiments, device support assembly 160 and flap 180 can together cover and protect a back surface of the tablet computing device and features located thereon. Device support assembly 160 can include a main device region 161 and a tab 170. In various embodiments, device support assembly 160 can overlap with flap 180 at tab 170, but main device region 161 does not overlap with flap 180. In a number of embodiments, flap 180 can fold at a flap hinge 181 to expose a camera on the back side of the tablet computing device, so as to allow use of the camera while tablet computer camera case 100 is holding the tablet computing device, as shown in FIG. 5 and described below in further detail. In certain embodiments, flap 180 can include a tab region 182 and an exposure region 183, such that tab region 182 can overlap with tab 170, but exposure region 183 does not overlap with tab 170, when flap 180 is folded up, as shown in FIG. 1.

In a number of embodiments, the inner and/or outer layers of device support assembly 160 and/or flap 180 can be made of leather (e.g., split leather), suede, polypropylene, polyethylene, nylon, fabric, or another suitable material. In some embodiments, the inner and/or outer layers of device support assembly 160 and/or flap 180 can each be made of the same or different material. In many embodiments, device support assembly 160 and/or flap 180 can include stiffener layers between the inner and outer layers. The stiffener layers can be made of a suitable rigid or semi-rigid material, such as cardboard, ABS, plastic, foam, or another suitable material. In certain embodiments, the layers can be stitched together or attached with an adhesive. In a number of embodiments, flap hinge 181 does not include a stiffener layer, so as to allow flap 180 to fold flexibly with respect to device support assembly 160 at flap hinge 181.

In many embodiments, device support assembly 160 can have a greater thickness at main device region 161 than at tab 170, such that the thickness of main device region 161 is substantially similar to the combined thickness of tab 170 of device support assembly 160 and tab region 182 of flap 180. In a number of embodiments, flap 180 can have a uniform thickness across tab region 182 and exposure region 183. In other embodiments, exposure region 183 can have a thickness greater than tab region 182, such that the thickness of exposure region 183 can be substantially similar to the thickness of main device region 161 and/or the combined thickness of tab 170 and tab region 182.

In various embodiments, flap 180 can be bounded by flap hinge 181, a portion of top edge 101 and a portion of back edge 151. In a number of embodiments, flap 180 can have a triangular shape. In certain embodiments, flap hinge 181 can be at approximately a 45 degree angle with respect to top edge 101 and back edge 151. In some embodiments, tab 170 and/or tab region 182 can be triangular, and/or can extend along back edge 151 from the interface of flap hinge 181 partially toward top edge 101.

In many embodiments, device support assembly 160 can include a side support 162, a top corner support 163, and/or a bottom corner support 164. Side support 162, top corner support 163, and/or bottom corner support 164 can wrap around the edges and/or corners of the tablet computing device to receive and fittingly secure the tablet computing device to tablet computer camera case 100. In a number of embodiments, side support 162, top corner support 163 and/or bottom corner support 164 can be made of a suitable rigid polymer (e.g., polycarbonate (PC) or ABS), metal (e.g., aluminum), ceramic material, TPE (e.g., thermoplastic polyurethane (TPU)), and/or semi-rigid polymer.

In various embodiments, side support 162 can be positioned at or proximate to back edge 151. In many embodiments, side support 162 does not move relative to back cover 150. In a number of embodiments, top corner support 163 and/or bottom corner support 164 can be located at or proximate to back spine edge 142. In many embodiments, top corner support 163 can extend elastically toward back spine edge 142 and top edge 101, and/or bottom corner support 164 can extend elastically toward back spine edge 142 and bottom edge 102. In certain embodiments, device support assembly 160 can include a top corner channel 173 and/or a bottom corner channel 174, which can be configured to provide a support base and/or to hold in position top corner support 163 and/or bottom corner support 164 at various extension positions. In many embodiments, by locating side support 162, which can be stationary, at back edge 151, and by locating top corner support 163 and bottom corner support 164, which are extendable, at back spine edge 142, back cover 150 can advantageously secure a tablet computing device within tablet computer camera case 100 when tablet computer camera case 100 is in a closed cover configuration, such that the tablet computing device does not extend past back edge 151. Side support 162 can advantageously create a stable stationary support to secure the tablet computing device in a stationary position within tablet computer camera case 100.

Figure 2:
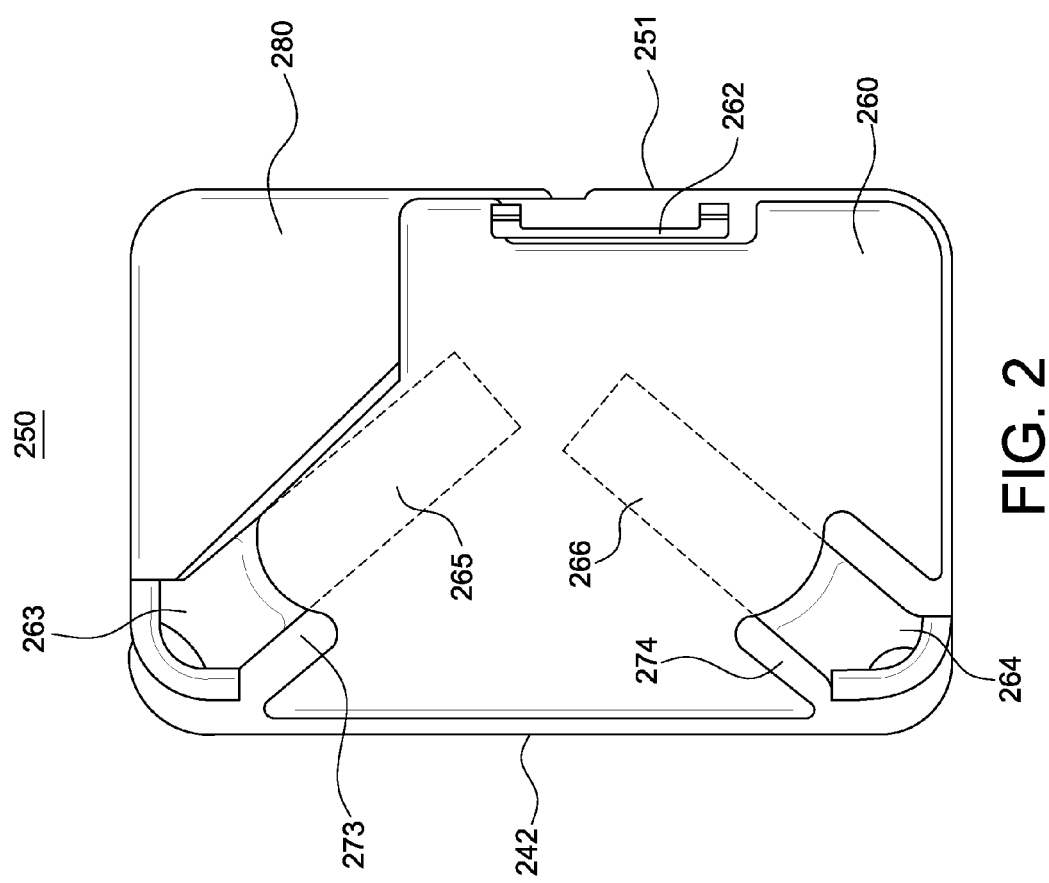
FIG. 2 illustrates a top view of a back cover for a case, showing the flexible extension construction of corner supports, according to another embodiment.

Turning ahead in the drawings, FIG. 2 illustrates a top view of a back cover 250 for a tablet computer camera case, such as tablet computer camera case 100 (FIG. 1), showing the flexible extension construction of the corner supports. Back cover 250 is merely exemplary, and embodiments of the back cover are not limited to the embodiments presented herein. The back cover can be employed in many different embodiments or examples not specifically depicted or described herein. Back cover 250 can be similar to back cover 150 (FIG. 1), and various components and/or constructions of back cover 250 can be similar or identical to various components of back cover 150 (FIG. 1). Back cover 250 can include device support assembly 260 and/or flap 280. Device support assembly 260 can be similar to device support assembly 160 (FIG. 1), and flap 280 can be similar to flap 180 (FIG. 1). Various components and/or constructions of device support assembly 260 can be similar or identical to various components of device support assembly 160 (FIG. 1), and various components and/or constructions of flap 280 can be similar or identical to various components of flap 180 (FIG. 1).

In many embodiments, device support assembly 260 can include a side support 262, a top corner support 263, and/or a bottom corner support 264, which can be similar to side support 162 (FIG. 1), top corner support 163 (FIG. 1), and/or bottom corner support 164 (FIG. 1), respectively. Device support assembly 260 can include a top corner channel 273 and/or a bottom corner channel 274. In many embodiments, device support assembly 260 can include a top corner extender 265 and/or a bottom corner extender 266. Top corner extender 265 can be attached at one end to top corner support 263, and bottom corner extender 266 can be attached at one end to bottom corner support 264, and top corner extender 265 and/or bottom corner extender 266 can each be attached at the other end to a stationary component of device support assembly 260, such as one or more of the inner, outer, or stiffener layers of device support assembly 260. In many embodiments, top corner extender 265 can located within an interior channel extending inward from top corner channel 273, and bottom corner extender 266 can be located within an interior channel extending inward from bottom corner channel 274. Top corner extender 265 and bottom corner extender 266 can be made partially or fully of an elastomeric material, such as rubber, which can allow top corner support 263 to extend elastically along top corner channel 273 and bottom corner support 264 to extend elastically along bottom corner channel 274.

In various embodiments, side support 262, top corner support 263, and/or bottom corner support 264 can be configured to receive and fittingly secure tablet computing devices of various dimensions to back cover 250. Side support 262 can have a fixed position with respect to back cover 250 and can be located at or proximate to a back edge 251, which can hold the right side of the tablet computing device at a fixed position at or proximate to back edge 251. Top corner support 263 and/or bottom corner support 264 can be located at or proximate to a back spine edge 242, and can be positioned closer to back spine edge 242 when holding a wider tablet computing device than when holding a narrower tablet computing device. For example, back cover 250 can hold a Kindle Fire®, developed and sold by Amazon.com, Inc., having a seven-inch screen, or can hold a Samsung Galaxy Tab® 3, developed and sold by Samsung Group, having an eight-inch screen. In each case, the right side of the tablet computing device can be held close to back edge 251 by side support 262. Top corner support 263 and bottom corner support 264 can extend to wrap around the left-side corners of the tablet computing device and fittingly secure the device to back cover 250. For the Samsung Galaxy Tab® 3, top corner support 263 and bottom corner support 264 can be extended further along top corner channel 273 and bottom corner channel 274, respectively, than for the Kindle Fire®, and the left-most side of the Samsung Galaxy Tab® 3 can be closer to back spine edge 242 than the left-most side of the Kindle Fire®.

Figure 3:
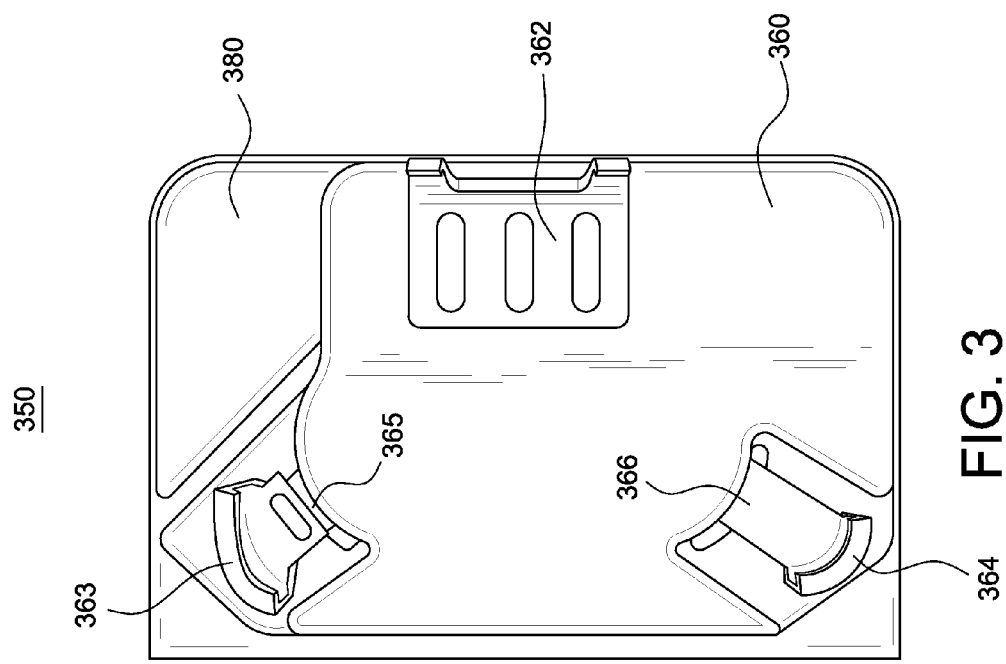
FIG. 3 illustrates a top view of a back cover for a case, showing modifications to the side support, the top corner support and the bottom corner support, according to another embodiment.
Figure 4:
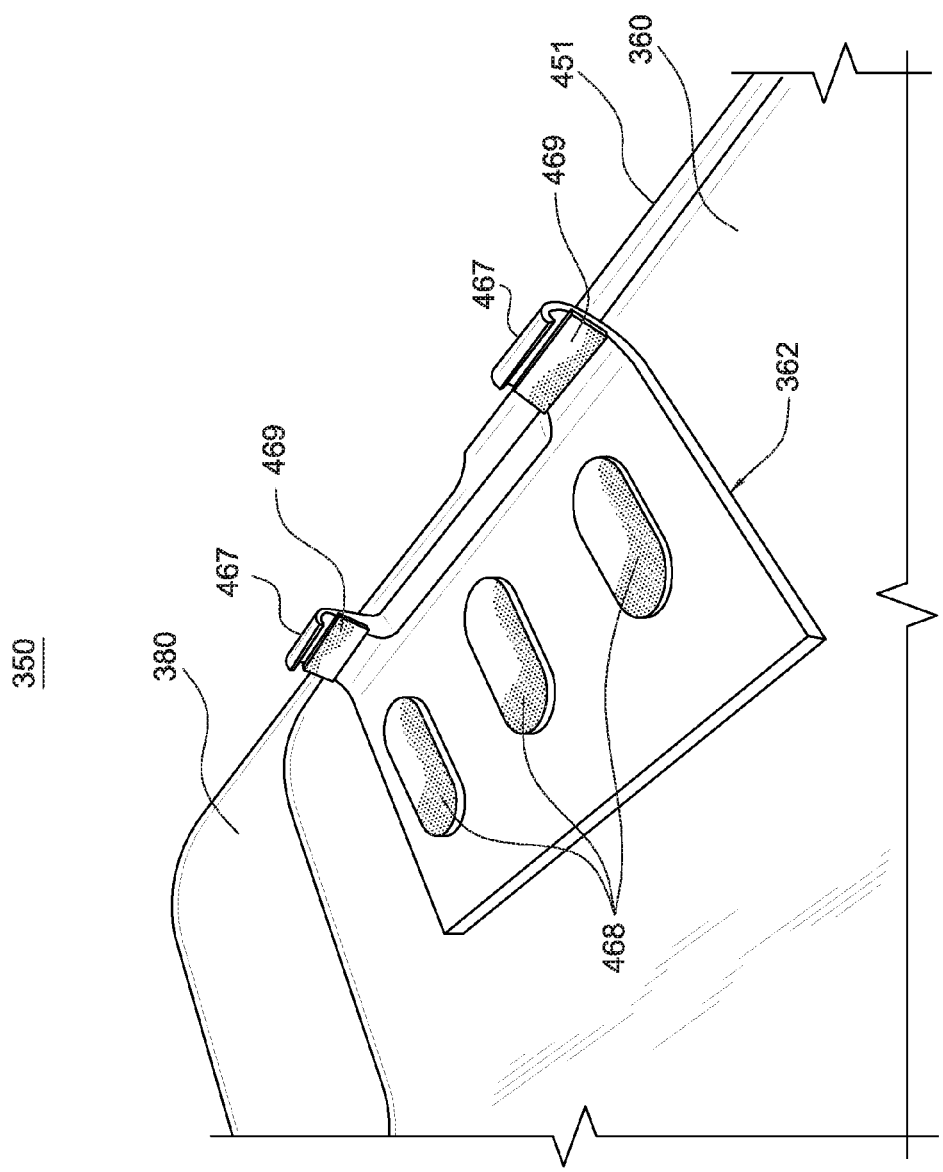
FIG. 4 illustrates a bottom left side perspective view of a portion of the back cover of FIG. 3, showing the side support.

Turning ahead in the drawings, FIG. 3 illustrates a top view of a back cover 350 for a tablet computer camera case, such as tablet computer camera case 100 (FIG. 1), showing modifications to the side support, the top corner support and the bottom corner support. FIG. 4 illustrates a bottom left side perspective view of a portion of back cover 350, showing the side support. Back cover 350 is merely exemplary, and embodiments of the back cover are not limited to the embodiments presented herein. The back cover can be employed in many different embodiments or examples not specifically depicted or described herein. Back cover 350 can be similar to back cover 150 (FIG. 1) and/or back cover 250 (FIG. 2), and various components and/or constructions of back cover 350 can be similar or identical to various components of back cover 150 (FIG. 1) and/or back cover 250 (FIG. 2). Back cover 350 can include device support assembly 360 and/or flap 380. Device support assembly 360 can be similar to device support assembly 160 (FIG. 1) and/or device support assembly 260 (FIG. 2), and flap 380 can be similar to flap 180 (FIG. 1) and/or flap 280 (FIG. 2). Various components and/or constructions of device support assembly 360 can be similar or identical to various components of device support assembly 160 (FIG. 1) and/or device support assembly 260 (FIG. 2), and various components and/or constructions of flap 380 can be similar or identical to various components of flap 180 (FIG. 1) and/or flap 280 (FIG. 2).

In many embodiments, device support assembly 360 can include a side support 362, a top corner support 363, and/or a bottom corner support 364. Top corner support 363 can be attached to a top corner extender 365 and bottom corner support 364 can be attached to a bottom corner extender 366. As shown in FIG. 3, top corner support 363 can be stitched to top corner extender 365, and bottom corner support 364 can be stitched to bottom corner extender 366. In many embodiments, top corner support 363 and/or bottom corner support 364 can each have an extended lip that is configured to hold a corner portion of the top surface of various different tablet computing devices.

As shown in FIG. 4, side support 362 can include one or more clips 467. For example, as shown in FIG. 4, side support 362 can include two clips 467 at each end of side support 362 along a back edge 451. In some embodiments, clips 467 can have sufficient depth to hold tablet computing devices having various different thicknesses. In many embodiments, clips 467 can include extended lips that can be configured to hold a side portion of the top surface of various different tablet computing devices. In many embodiments, side support 362 can include one or more pads 468. Pads 468 can be made of an elastomeric non-slip material, such as rubber, TPE, or another suitable material. Pads 468 can provide a back support for the tablet computing devices to press the screen of the tablet computing devices against the lips on clips 467. Pads 468 can compress when side support 362 holds a thicker tablet computing device, and can be uncompressed when side support 362 holds a thinner tablet computing device. In many embodiments, non-slip properties of pads 468 can hold the tablet computing device securely in position with respect to back cover 350 and prevent any shifting that could cause the tablet computing device to inadvertently become dislodged from side support 362, top corner support 363 (FIG. 3), and/or bottom corner support 364 (FIG. 3). In some embodiments, clips 467 can include one or more pads 469. Pads 469 can be similar to pads 468, and can be made of an elastomeric non-slip material, such as rubber, TPE, or another suitable material. Pads 469 can beneficially prevent the tablet computing device from becoming dislodged from side support 362.

Turning ahead in the drawings, FIG. 5 illustrates a top view of tablet computer camera case 100 in an open, unfolded configuration with a tablet computing device 590 being held by device support assembly 160. In many embodiments, tablet computer camera case 100 can include a front cover magnet 522 and/or a screen 593, such as a touchscreen. In some embodiments, front cover magnet 522 can be located on outer segment 112. In a number of embodiments, front cover magnet 522 can be configured to magnetically couple with a magnetically attractable element 592 in tablet computing device 590, which can hold tablet computer camera case 100 in a closed cover configuration, as shown in FIGS. 6-7. In some embodiments, front cover magnet 522 and/or another magnet within front cover 110 can be configured to engage with a wake sensor within tablet computing device 590, such that tablet computing device 590 can turn itself on when front cover 110 is opened away from covering tablet computing device 590, and to turn itself off when front cover 110 is closed to cover tablet computing device 590. In many embodiments, tablet computer camera case 100 can be configured to hold compact tablet computing devices, such as tablet computing devices having a diagonal screen size between approximately 6.5 to 8.5 inches. Tablet computing device 590 shown in FIG. 5 has an eight-inch screen, which can be among the larger of the tablet computing devices that are capable of being used with tablet computer camera case 100.

Turning ahead in the drawings, FIG. 6 illustrates a top view of tablet computer camera case 100 in a closed cover configuration, showing front cover 110. FIG. 7 illustrates a bottom view of tablet computer camera case 100 in a closed cover configuration, showing back cover 150. In many embodiments, when tablet computer camera case 100 is in a closed cover configuration, such as shown in FIGS. 6-7, tablet computer camera case 100 can securely support and/or encase the tablet computing device. In various embodiments in a closed cover configuration, the inner surfaces of front cover 110 and back cover 150 can rest against and/or be positioned in close proximity to and substantially parallel to the tablet computing device. As shown in FIG. 7, in many embodiments back cover 150 can include a handle magnet 752. Handle magnet 752 can be configured to magnetically couple with front cover magnet 522 to hold front cover 110 in a folded triangular configuration, as shown in FIGS. 8-9, and 11-12.

In many embodiments, flap 180 can include a flap magnet 754, and main device region 161 can include a flap-down magnet 753. Flap magnet 754 and flap-down magnet 753 can be configured to magnetically couple with each other to secure flap 180 in an exposed configuration, as shown in FIG. 10-13, described below. Flap magnet 754 can be located at a position mirrored across flap hinge 181 from flap-down magnet 753.

Turning ahead in the drawings, FIG. 8 illustrates a bottom side perspective view of tablet computer camera case 100 holding tablet computing device 590 in a viewing configuration. FIG. 9 illustrates a front side perspective view of tablet computer camera case 100 holding tablet computing device 590 in a typing configuration. In a viewing configuration, as shown in FIG. 8, or a typing configuration, as shown in FIG. 9, front cover 110 can be folded such that the inner side of outer segment 112 rests against the outer side of back cover 150. As described above, handle magnet 752 (FIG. 7) can engage with front cover magnet 522 (FIGS. 5-6) to secure front cover 110 in the folded triangular configuration.

In a viewing configuration, as shown in FIG. 8, tablet computer camera case 100 can be placed upon a surface such that inner segment 114 can rest upon the surface, and the folded triangular configuration of front cover 110 can prop up back cover 150, such that tablet computer camera case 100 can support tablet computing device 590 in an upright configuration. In many embodiments in the viewing configuration, back cover 150 can be at an angle with respect to the surface of between approximately 50 to 89 degrees. The viewing configuration can provide a comfortable and/or ergonomic position for viewing tablet computing device 590, such as when using tablet computing device 590 to watch a video.

In a typing configuration, as shown in FIG. 9, tablet computer camera case 100 can be placed upon a surface such that inner segment hinge 116 and back edge 151 can rest upon the surface, with the folded triangular configuration of front cover 110 propping up the side of back cover 150 near spine 140, such that tablet computer camera case 100 can support tablet computing device 590 in a slightly inclined position. In many embodiments in the typing configuration, back cover 150 can be at an angle with respect to the surface of between approximately 3 and 30 degrees. The typing configuration can provide a balanced, comfortable and/or ergonomic position for manipulating a touch screen of tablet computing device 590, such as when typing on a virtual keyboard on the touch screen of tablet computing device 590.

Turning ahead in the drawings, FIG. 10 illustrates a bottom view of tablet computer camera case 100 in a closed cover configuration with flap 180 in an exposed configuration. As described above, flap magnet 754 can magnetically couple with flap-down magnet 753 (FIG. 7) to secure the outer side of flap 180 against the outer side of main device region 161. In an exposed configuration, back cover 150 can be folded at flap hinge 181. In an exposed configuration, exposure region 183 of flap 180 can be removed from covering tablet computing device 590, such that a tablet camera 1091 on the bottom side of tablet computing device 590 can be uncovered and exposed. The region of tablet computing device 590 that is uncovered by exposure region 183 when flap 180 is in an exposed configuration can allow tablet computer camera case 100 to uncover the rear-side camera of various different compact tablet computing devices, which can advantageously allow tablet computer camera case 100 to be used with various different compact tablet computing devices.

In many embodiments, tab 170 can include a tab magnet 1055. Flap magnet 754 can be located on tab region 182 of flap 180, such that flap magnet 754 can be configured to magnetically couple with tab magnet 1055 on tab 170. Flap magnet 754 and tab magnet 1055, when coupled together, can secure flap 180 in a closed cover configuration, as shown in FIG. 7.

Figure 11:
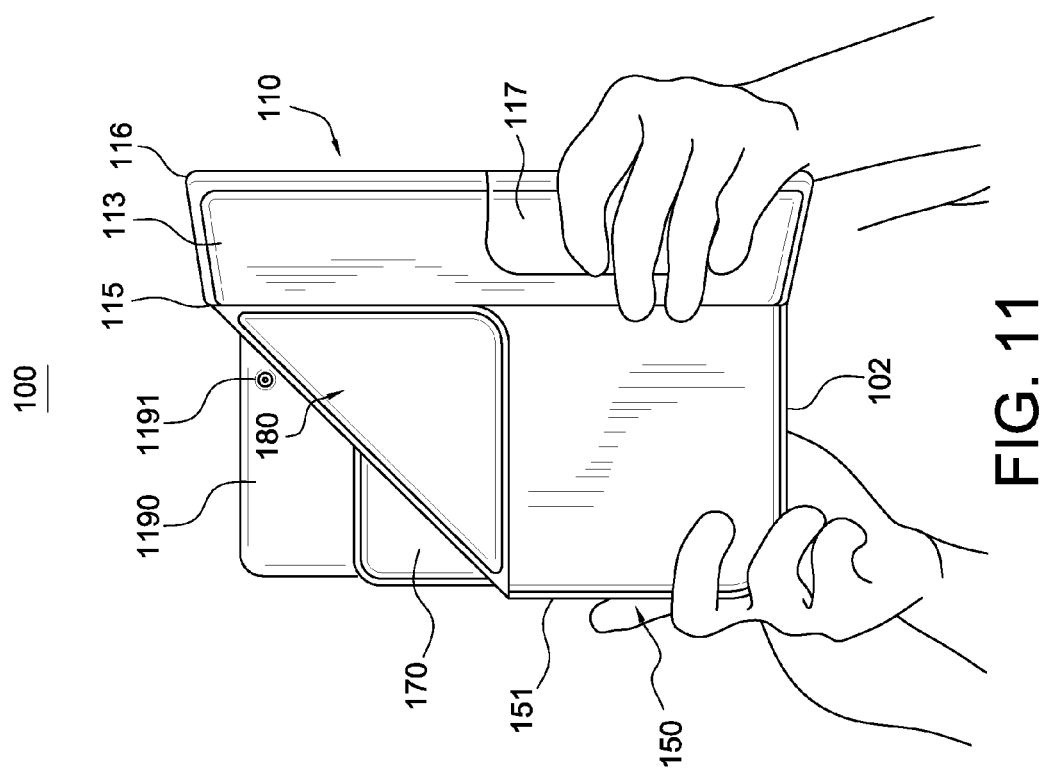
FIG. 11 illustrates a rear view of the case of FIG. 1 being used to take pictures in a portrait orientation.

Turning ahead in the drawings, FIG. 11 illustrates a rear view of tablet computer camera case 100 being used to take pictures in a portrait orientation. Tablet computer camera case 100 can hold a tablet computing device 1190, which can have dimensions that are different than tablet computing device 590 (FIGS. 5, 10). In a number of embodiments, tablet computing device 1190 can include a tablet camera 1191, which can be located position relative to back cover 150, as shown in FIG. 11, that is different from the position of tablet camera 1091 of tablet computing device 590 relative to back cover 150, as shown in FIG. 10. In many embodiments, flap 180 can be folded down in an exposed configuration (as shown in FIG.

10, described above), and front cover 110 can be folded in a triangular configuration (as shown in FIGS. 8-9, described above). In many embodiments, when front cover 110 is folded in a triangular configuration, flap 180 can fold down to an exposed configuration and/or fold up to a closed configuration without flap 180 overlapping with outer segment hinge 115 of front cover 110. When folded in a triangular configuration, front cover 110 can provide a handle to facilitate secure, comfortable, and/or ergonomic use of tablet computer camera case 100, and can prevent front cover 110 from flapping around unsecured. In many embodiments, front cover grip 117 can provide a secure grip for tablet computer camera case 100 when front cover 110 is folded as a handle in a triangular configuration. In various embodiments, tablet computer camera case 100 can be used in a portrait orientation by holding the handle formed by front cover 110, and/or holding back cover 150 near back edge 151 and/or bottom edge 102.

Figure 12:
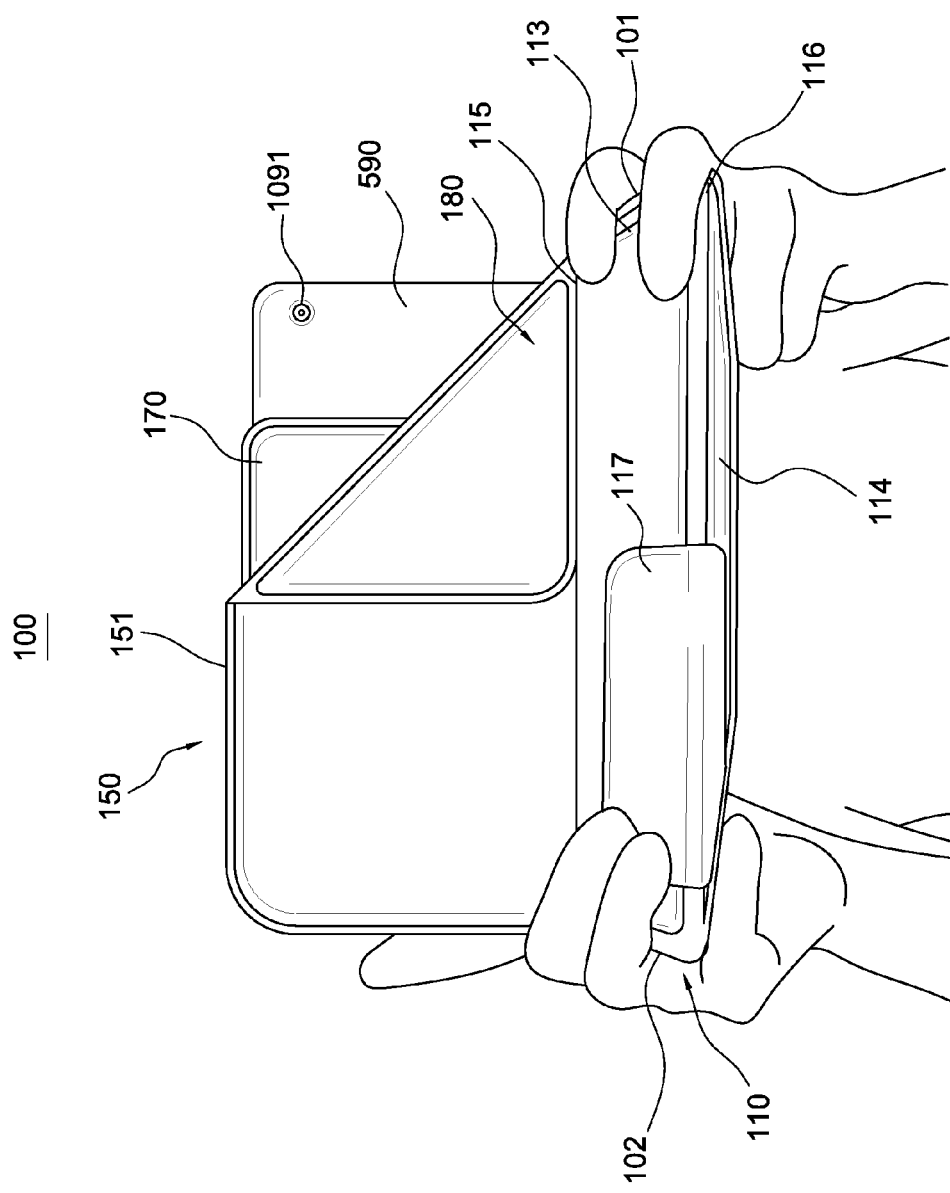
FIG. 12 illustrates a rear view of the case of FIG. 1 being used to take pictures in a landscape orientation.

Turning ahead in the drawings, FIG. 12 illustrates a rear view of tablet computer camera case 100 being used to take pictures with tablet camera 1091 of tablet computing device 590 in a landscape orientation. In many embodiments, flap 180 can be folded down in an exposed configuration (as shown in FIG. 10, described above), and front cover 110 can be folded in a triangular configuration (as shown in FIGS. 8-9, described above). In a number of embodiments, tablet computer camera case 100 can be used in a landscape orientation by holding the handle formed by front cover 110 at or near top edge 101 and/or bottom edge 102.

Turning ahead in the drawings, FIG. 13 illustrates a rear view of tablet computer camera case 100 being used in another configuration to take pictures to take pictures with tablet camera 1091 of tablet computing device 590 in a landscape orientation. In many embodiments, flap 180 can be folded down in an exposed configuration (as shown in FIG. 10, described above), and front cover 110 can be opened and unsecured (as shown in FIG. 13). In various embodiments, tablet computer camera case 100 can be used in a landscape orientation by holding tablet computer camera case 100 at top flexible spine corner 143 and/or bottom flexible spine corner 144. Top flexible spine corner 143 and/or bottom flexible spine corner 144 can provide a flexible structural indentation in top edge 101 and/or bottom edge 102 that can advantageously provide for improved handling and/or grip of tablet computer camera case 100 when used to take pictures in a landscape orientation, as shown in FIG. 13.

Figure 14:
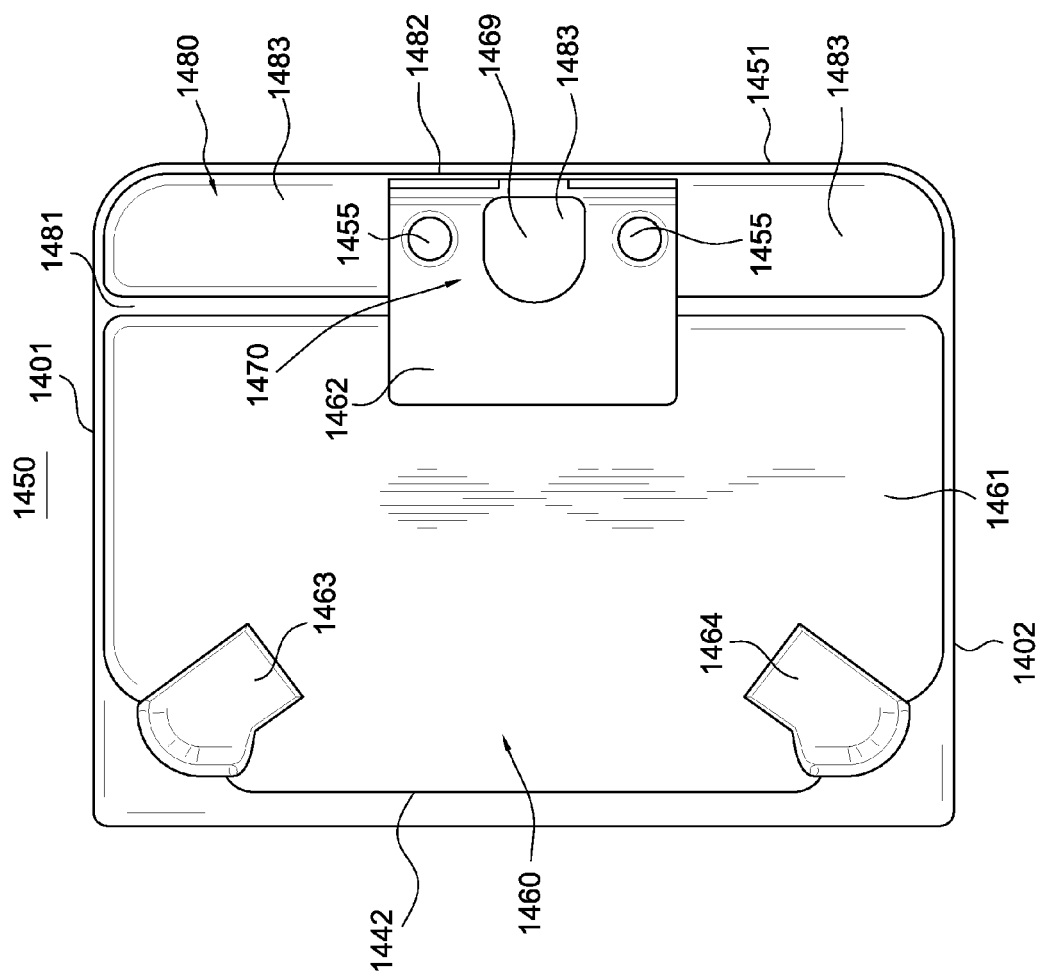
FIG. 14 illustrates a top view of a back cover for the case of FIG. 15.

Turning ahead in the drawings, FIG. 14 illustrates a top view of a back cover 1450 for another embodiment of a tablet computer camera case, such as tablet computer camera case 1500 (shown in FIG. 15, described below). Back cover 1450 is merely exemplary, and embodiments of the back cover are not limited to the embodiments presented herein. The back cover can be employed in many different embodiments or examples not specifically depicted or described herein. Back cover 1450 can be similar to back cover 150 (FIG. 1), back cover 250 (FIG. 2), and/or back cover 350 (FIG. 3), and various components and/or constructions of back cover 1450 can be similar or identical to various components of back cover 150 (FIG. 1), back cover 250 (FIG. 2), and/or back cover 350 (FIG. 3).

In many embodiments, back cover 1450 can include a device support assembly 1460 and/or a flap 1480. In some embodiments, device support assembly 1460 and flap 1480 can together cover and/or protect a back surface of a tablet computing device and features located thereon. Device support assembly 1460 can include a main device region 1461 and a tab 1470. In various embodiments, device support assembly 1460 can overlap with flap 1480 at tab 1470, but main device region 1461 does not overlap with flap 1480. In a number of embodiments, flap 1480 can fold at a flap hinge 1481 to expose a camera on the back surface of the tablet computing device, so as to allow use of the camera while the tablet computer camera case is holding the tablet computing device. In certain embodiments, flap 1480 can include a tab region 1482 and an exposure region 1483, such that tab region 1482 can overlap with tab 1470, but exposure region 1483 does not overlap with tab 1470, when flap 1480 is folded out, as shown in FIG. 14.

In various embodiments, flap 1480 can be bounded by flap hinge 1481, a back edge 1451, a portion of a top edge 1401, and a portion of a bottom edge 1402. In a number of embodiments, flap 1480 can have a rectangular shape. In certain embodiments, flap hinge 1481 can be substantially orthogonal with respect to top edge 1401 and bottom edge 1402, and/or substantially parallel to back edge 1451. In some embodiments, back cover 1450 can include a back spine edge 1442. Back spine edge 1442 can be similar or identical to back spine edge 142 (FIG. 1) and/or back spine edge 242 (FIG. 2).

In a number of embodiments, device support assembly 1460 can include a side support 1462. In many embodiments, side support 1462 can be attached to main device region 1461 and can extend to overlap with flap 1480. In some embodiments, tab 1470 can be the portion of side support 1462 that overlaps with flap 1480. In various embodiments, side support 1462 can include an aperture 1469. In such embodiments, aperture 1469 can create an additional exposure region 1483 of flap 1480, such that tab 1470, which can cover tab region 1482 but not exposure region 1483, does not include aperture 1469. In many embodiments, aperture 1469 can be centered between top edge 1401 and bottom edge 1402.

In a number of embodiments, back cover 1450 can include top corner support 1463 and/or bottom corner support 1464. Side support 1462, top corner support 1463, and/or bottom corner support 1464 can be configured to wrap around the edges and/or corners of the tablet computing device to receive and fittingly secure the tablet computing device to the tablet computer camera case. Side support 1462 can be similar to side support 162 (FIG. 1), side support 262 (FIG. 2), and/or side support 362 (FIG. 3); top corner support 1463 can be identical or similar to top corner support 163 (FIG. 1), top corner support 263 (FIG. 2), and/or top corner support 363 (FIG. 3); and bottom corner support 1464 can be identical or similar to bottom corner support 1464 (FIG. 1), bottom corner support 264 (FIG. 2), and/or bottom corner support 364 (FIG. 3). In many embodiments, side support 1462, top corner support 1463, and/or bottom corner support 1464 can secure various tablet computing devices having different dimensions. In various embodiments, back cover 1450 can be configured to hold full-size tablet computing devices, such as tablet computing devices having a diagonal screen size between approximately 9.0 to 11.0 inches.

In many embodiments, tab 1470 can include a one or more tab magnets 1455. For example, as shown in FIG. 14, tab 1470 can include two magnets at each side of aperture 1469. In a number of embodiments, tab magnets 1455 can be molded into side support 1462

Figure 15:
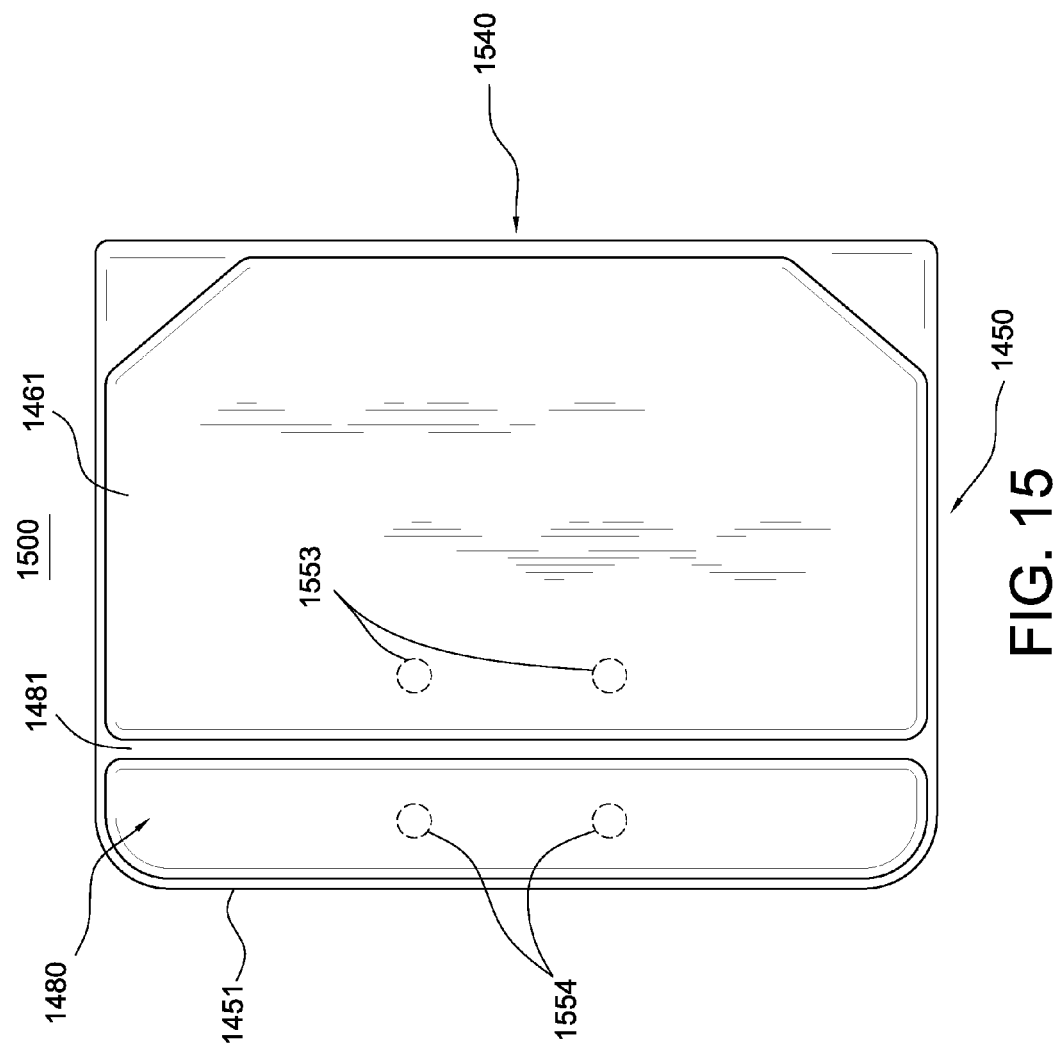
FIG. 15 illustrates a bottom view of a case in a closed cover configuration, according to another embodiment.

Turning ahead in the drawings, FIG. 15 illustrates a bottom view of tablet computer camera case 1500 in a closed cover configuration. Tablet computer camera case 1500 is merely exemplary, and embodiments of the tablet computer camera case are not limited to the embodiments presented herein. The tablet computer camera case can be employed in many different embodiments or examples not specifically depicted or described herein. Tablet computer camera case 1500 can be similar to tablet computer camera case 100 (FIG. 1), and various components and/or constructions of tablet computer camera case 1500 can be similar or identical to various components of tablet computer camera case 100 (FIG. 1). Tablet computer camera case 1500 can include back cover 1450 and/or spine 1540. Spine 1540 can be similar to spine 140 (FIG. 1), and various components and/or constructions of spine 1540 can be similar or identical to various components of spine 140 (FIG. 1).

In a number of embodiments, flap 1480 can include one or more flap magnets 1554, and main device region 1461 can include one or more flap-down magnets 1553. Flap magnets 1554 and flap-down magnets 1553 can be configured to magnetically couple with each other to secure flap 1480 in an exposed configuration, as shown in FIG. 16, described below. Flap magnets 1554 can be located at a position mirrored across flap hinge 1481 from flap-down magnets 1553.

Turning ahead in the drawings, FIG. 16 illustrates a bottom view of tablet computer camera case 1500 holding a tablet computing device 1690, with flap 1480 in an exposed configuration. Tablet computer camera case 1500 can include front cover 1610. Front cover 1610 can be similar to front cover 110 (FIG. 1), and various components and/or constructions of front cover 1610 can be similar or identical to various components of front cover 110 (FIG. 1). As described above, flap magnets 1554 can magnetically couple with flap-down magnets 1553 (FIG. 15) to secure the outer side of flap 1480 against the outer side of main device region 1461. In an exposed configuration, back cover 1450 can be folded at flap hinge 1481. In an exposed configuration, exposure region 1483 (FIG. 14) of flap 1480 can be removed from covering tablet computing device 1690, such that a tablet camera 1691 on the bottom side of tablet computing device 1690 can be uncovered and exposed.

The region of tablet computing device 1690 that is uncovered by exposure region 1483 (FIG. 14) when flap 1480 is in an exposed configuration can allow tablet computer camera case 1500 to uncover the rear-side camera of various different full-size tablet computing devices, which can advantageously allow tablet computer camera case 1500 to be used with various different full-size tablet computing devices. For example, some full-size tablet computing devices can include a rear-side camera that can be positioned within aperture 1469 when the tablet computing device is held by tablet computer camera case 1500. Other full-size tablet computing devices can include rear-side cameras positioned outside of tab 1470, such as camera 1691 on tablet computing device 1690.

In many embodiments, flap magnets 1554 can magnetically couple with tab magnets 1455 to secure the inner side of flap 1480 against the outer side of tab 1470. Flap magnets 1554 and tab magnets 1455 can together secure flap 1480 in a closed configuration, as shown in FIG. 15.

Turning ahead in the drawings, FIG. 17 illustrates a flow chart for an embodiment of a method 1700 of providing an case. Method 1700 is merely exemplary and is not limited to the embodiments presented herein. Method 1700 can be employed in many different embodiments or examples not specifically depicted or described herein. In some embodiments, the procedures, the processes, and/or the activities of method 1700 can be performed in the order presented. In other embodiments, the procedures, the processes, and/or the activities of the method 1700 can be performed in any other suitable order. In still other embodiments, one or more of the procedures, the processes, and/or the activities in method 1700 can be combined or skipped. In some embodiments, the case can be similar or identical to tablet computer camera case 100 (FIGS. 1, 5-13) and/or tablet computer camera case 1500 (FIGS. 15-16).

Referring to FIG. 17, method 1700 can include a block 1701 of providing a front cover. In many embodiments, the front cover can be similar or identical to front cover front cover 110 (FIG. 1) and/or front cover 1610 (FIG. 16). In a number of embodiments, the front cover can include an outer segment. The outer segment can be similar or identical to outer segment 112 (FIG. 1). In several embodiments, the outer segment can include a fourth magnet. The fourth magnet can be similar or identical to front cover magnet 522 (FIGS. 5-6). In various embodiments, the front cover can include a middle segment. The middle segment can be similar or identical to middle segment 113 (FIG. 1). In some embodiments, the front cover can include an inner segment. The inner segment can be similar or identical to inner segment 114 (FIG. 1). In many embodiments, the front cover can include a non-slip grip extending at least partially across the middle segment and extending at least partially across the inner segment. The non-slip grip can be similar or identical to front cover group 117 (FIG. 1).\

In some embodiments, method 1700 can include a block 1702 of providing a back cover. The back cover can be similar or identical to back cover 150 (FIG. 1), back cover 250 (FIG. 2), back cover 350 (FIG. 3), and/or back cover 1450 (FIG. 14). In a number of embodiments, the back cover can include a back edge. The back edge can be similar or identical to back edge 151 (FIG. 1), back edge 251 (FIG. 2), back edge 451 (FIG. 4), and/or back edge 1451 (FIG. 14). In several embodiments, the back cover can include a device support assembly. The device support assembly can be similar or identical to device support assembly 160 (FIG. 1), device support assembly 260 (FIG. 2), device support assembly 360 (FIGS. 3-4), and device support assembly 1460 (FIG. 14). In various embodiments, the device support assembly can include a main device region and a tab. The main device region can be similar or identical to main device region 161 (FIG. 1) and/or main device region 1461 (FIG. 14). The tab can be similar or identical to tab 170 (FIG. 1) and/or tab 1470 (FIG. 14). In many embodiments, the back cover can include a flap. The flap can be similar or identical to flap 180 (FIGS. 1, 5, 7-13), flap 280 (FIG. 2), flap 380 (FIGS. 3-4), and/or flap 1480 (FIGS. 14-16). In many embodiments, the flap can include an exposure region and a tab region. The exposure region can be similar or identical to exposure region 183 (FIGS. 1, 10) and/or exposure region 1483 (FIG. 14).

In a number of embodiments, the case can include a top edge and a bottom edge. The top edge can be similar or identical to top edge 101 (FIG. 1) and/or top edge 1401 (FIG. 14). The bottom edge can be similar or identical to bottom edge 102 (FIG. 1) and/or bottom edge 1402 (FIG. 14). In some embodiments, the flap can fold relative to the main device region of the device support assembly along a flap hinge. The flap hinge can be similar or identical to flap hinge 181 (FIGS. 1, 7, 10) and/or flap hinge 1481 (FIGS. 14-16). In several embodiments, the flap hinge can extend from a first edge of the back cover to a second edge of the back cover. In many embodiments, the first edge of the back cover can be the top edge of the case. In some embodiments, the second edge of the back cover can be the back edge of the back cover. In other embodiments, the second edge of the back cover can be the bottom edge of the case.

In several embodiments, the back cover can be configured to be removably coupled to a first electronic device. The first electronic device can be similar or identical to tablet computing device 590 (FIG. 5), tablet computing device 1191 (FIG.

11), and/or tablet computing device 1690 (FIG. 16). In several embodiments, the back cover can be configured to be removably coupled to a second electronic device when the first electronic device is not coupled to the back cover. The second electronic device can be similar or identical to tablet computing device 590 (FIG. 5), tablet computing device 1190 (FIG. 11) and/or tablet computing device 1690 (FIG. 16). In some embodiments, the first electronic device can include a first camera lens and first dimensions. The first camera lens can be similar or identical to tablet camera 1091 (FIGS. 10, 12-13), tablet camera 1191 (FIG. 11) and/or tablet camera 1691 (FIG. 16). In a number of embodiments, the second electronic device can include a second camera lens and second dimensions different from the first dimensions of the first electronic device. The second camera lens can be similar or identical to tablet camera 1091 (FIGS. 10, 12-13), tablet camera 1191 (FIG. 11) and/or tablet camera 1691 (FIG. 16). In several embodiments, the flap can be configured to be placed in an exposed configuration and a closed configuration. The exposed configuration can be as shown in FIGS. 10-13 and 16, described above. The closed configuration can be as shown in FIGS. 1-5, 7-9, and 14-15, described above.

In some embodiments, block 1702 of providing the back cover can include providing the back cover such that (1) when the back cover is coupled to the first electronic device and the flap is in an exposed configuration, the first camera lens of the first electronic device is located at a first position relative to the back cover and the first camera lens of the first electronic device is exposed; and (2) when the back cover is coupled to the second electronic device and the flap is in an exposed configuration, the second camera lens of the second electronic device is located at a second position relative to the back cover, the second camera lens of the second electronic device is exposed; and (3) the first position is different from the second position. For example, the first position can be similar or identical to the position of tablet camera 1091 in FIG. 10, and the second position can be similar or identical to the position of tablet camera 1191 in FIG. 11.

In some embodiments, when the back cover is coupled to the first electronic device and the flap is in the closed configuration, the device support assembly of the back cover can cover a first portion of a back side of the first electronic device, and the exposure region of the flap can cover the first camera lens at a second portion of the back side of the first electronic device. In a number of embodiments, when the back cover is coupled to the first electronic device and the flap is in the exposed configuration, the device support assembly of the back cover can cover the first portion of the back side of the first electronic device, and the first camera lens at the second portion of the back side of the first electronic device can be exposed and devoid of being covered by the exposure region of the flap. For example, the first portion of the back side of the first electronic device can be similar or identical to the portion of tablet computing device 590 that is covered by back cover 150 in FIG. 10, and the second portion of the back side of the first electronic device can be the portion of tablet computing device 590 that is exposed and uncovered by exposure region 183 in FIG. 10. As another example, the first portion of the back side of the first electronic device can be similar or identical to the portion of tablet computing device 1690 that is covered by back cover 1450 in FIG. 16, and the second portion of the back side of the first electronic device can be the portion of tablet computing device 1690 that is exposed and uncovered by exposure region 1483 (FIG. 14) in FIG. 16.

In various embodiments, when the back cover is coupled to the second electronic device and the flap is in the closed configuration, the device support assembly of the back cover can cover a first portion of a back side of the second electronic device, and the exposure region of the flap can cover the second camera lens at a second portion of the back side of the second electronic device. In a number of embodiments, when the back cover is coupled to the second electronic device and the flap is in the exposed configuration, the device support assembly of the back cover can cover the first portion of the back side of the second electronic device, and the second camera lens at the second portion of the back side of the second electronic device can be exposed and devoid of being covered by the exposure region of the flap. For example, the first portion of the back side of the second electronic device can be similar or identical to the portion of tablet computing device 1190 that is covered by back cover 150 in FIG. 11, and the second portion of the back side of the second electronic device can be the portion of tablet computing device 1190 that is exposed and uncovered by exposure region 183 (FIG. 10) in FIG. 11.

In many embodiments, the tab of the device support assembly can include a first magnet. The first magnet can be similar or identical to tab magnet 1055 (FIG. 10) and/or tab magnets 1455 (FIGS. 14, 16). In some embodiments, the tab region of the flap can include a second magnet. The second magnet can be similar or identical to flap magnet 754 (FIGS. 7, 10) and/or flap magnets 1554 (FIGS. 15-16). In several embodiments, the first magnet can be configured to magnetically couple with the second magnet to hold the flap in the closed configuration.

In various embodiments, the main device region of the device support assembly can include a third magnet. The third magnet can be similar or identical to flap-down magnet 753 (FIG. 7) and/or flap-down magnets 1553 (FIG. 15). In a number of embodiments, the third magnet can be configured to magnetically couple with the second magnet to hold the flap in the exposed configuration.

In some embodiments, the fourth magnet of the outer segment can be configured to magnetically couple with a sixth magnet in the first electronic device to hold the front cover in a closed cover configuration. The sixth magnet can be similar or identical to magnetically attractable element 592 (FIG. 5). In several embodiments, when the front cover is in the closed cover configuration, the front cover can cover a screen of the first electronic device. The screen can be similar to screen 593 (FIG. 5).

In some embodiments, the back cover can include a fifth magnet. The fifth magnet can be similar or identical to handle magnet 752 (FIG. 7). In several embodiments, the front cover can be configured to be folded in a triangular configuration such that the fourth magnet of the outer segment can be magnetically coupled to the fifth magnet of the back cover. For example, the triangular configuration of the front cover can be similar or identical to the configuration of the front cover shown in FIGS. 8-9 and 11-12. In many embodiments, when the front cover is folded in the triangular configuration, the case can be configured such that the flap can be folded from the closed configuration to the exposed configuration, such as shown in FIGS. 11-12.

In a number of embodiments, when the front cover is folded in the triangular configuration, the front cover can be configured to support the case on a surface in a viewing configuration and a typing configuration. In many embodiments, when the case is in the viewing configuration, the inner segment of the front cover can be placed on the surface to support the case, such as shown in FIG. 8. In several embodiments, when the case is in the typing configuration, the back edge of the back cover and an inner hinge segment located between the inner segment and the middle segment of the front cover can be placed on the surface to support the case, such as shown in FIG. 9. The inner hinge segment can be similar or identical to inner hinge segment 116 (FIGS. 1, 8-9).

In some embodiments, the device support assembly of the back cover can include a side support proximate the back edge of the back cover. The side support can be similar or identical to side support 162 (FIG. 1), side support 262 (FIG. 2), side support 362 (FIGS. 3-4), and/or side support 1462 (FIGS. 14, 16). In several embodiments, the back cover can include a top corner support located proximate to a first corner at a back spine edge of the back cover and the top edge of the case. The top corner support can be similar or identical to top corner support 163 (FIG. 1), top corner support 263 (FIG. 2), top corner support 363 (FIG. 3), and/or top corner support 1463 (FIG. 14). The back spine edge can be similar or identical to back spine edge 142 (FIG. 1), back spine edge 242 (FIG. 2), and/or back spine edge 1442 (FIG. 14). In many embodiments, the back spine edge can be located at the back cover opposite the back edge. In many embodiments, the top corner support can be configured to elastically extend toward the first corner. In a number of embodiments, the back cover can include a bottom corner support located proximate to a second corner at the back spine edge of the back cover and the bottom edge of the case. The bottom corner support can be similar or identical to bottom corner support 164 (FIG. 1), bottom corner support 264 (FIG. 2), bottom corner support 364 (FIG. 3), and/or bottom corner support 1464 (FIG. 14). In several embodiments, the bottom corner support can be configured to elastically extend toward the second corner. In a number of embodiments, the side support, the top corner support, and the bottom corner support can be configured to removably couple the first electronic device to the back cover. In several embodiments, the side support, the top corner support, and the bottom corner support can be configured to removably couple the second electronic device to the back cover when the first electronic device is not coupled to the back cover. In various embodiments, the side support of the device support assembly can include one or more non-slip pads. The non-slip pads can be similar or identical to pads 468 (FIG. 4) and/or pads 469 (FIG. 4).

In some embodiments, method 1700 can providing a spine. The spine can be similar or identical to spine 140 (FIGS. 1, 5-10, 13) and/or spine 1540 (FIGS. 15-16). In many embodiments, the spine can be located between the front cover and the back cover. In some embodiments, the spine can extend between the top edge of the case and the bottom edge of the case. In some embodiments, the spine can include a first spine region located proximate to the top edge of the case. The first spine region can be similar or identical to top flexible spine corner 143 (FIGS. 1, 5, 13). In many embodiments, the spine can include a second spine region located proximate to the bottom edge of the case. In various embodiments, the first spine region can be configured to flexibly indent at the top edge of the case. The second spine region can be similar or identical to bottom flexible spine corner 144 (FIGS. 1, 13). In various embodiments, the second spine region can be configured to flexibly indent at the bottom edge of the case.

Although the invention has been described with reference to specific embodiments, it will be understood by those skilled in the art that various changes may be made without departing from the spirit or scope of the invention. For example, tablet computer camera case 1500 (FIG. 15) can include certain components of tablet computer camera case 100 (FIG. 1), such as front cover magnet 522 (FIGS. 5-6) and handle magnet 752 (FIG. 7), which can allow use of tablet computer camera case 1500 in both a viewing configuration (as shown in FIG. 8, described above) and a typing configuration (as shown in FIG. 9, described above). Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that various elements of FIGS. 1-17 may be modified, and that the foregoing discussion of certain of these embodiments does not necessarily represent a complete description of all possible embodiments. As another example, one or more of the procedures, processes, or activities of FIG. 17 may include different procedures, processes, and/or activities and be performed in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A case comprising:
   a front cover; and
   a back cover comprising:
      a back edge;
      a device support assembly comprising a main device region and a tab; and
      a flap comprising an exposure region and a tab region,
   wherein:
      the case comprises a top edge and a bottom edge;
      the back cover is configured to be removably coupled to a first electronic device;
      the back cover is configured to be removably coupled to a second electronic device when the first electronic device is not coupled to the back cover;
      the first electronic device comprises a first camera lens and first dimensions;
      the second electronic device comprises a second camera lens and second dimensions different from the first dimensions of the first electronic device; and
      the flap is configured to be placed in an exposed configuration and a closed configuration.

2. The case of claim 1, wherein:
   when the back cover is coupled to the first electronic device and the flap is in an exposed configuration, the first camera lens of the first electronic device is located at a first position relative to the back cover and the first camera lens of the first electronic device is exposed;
   when the back cover is coupled to the second electronic device and the flap is in an exposed configuration, the second camera lens of the second electronic device is located at a second position relative to the back cover and the second camera lens of the second electronic device is exposed; and
   the first position is different from the second position.

3. The case of claim 1, wherein:
when the back cover is coupled to the first electronic device and the flap is in the closed configuration, the device support assembly of the back cover covers a first portion of a back side of the first electronic device, and the exposure region of the flap covers the first camera lens at a second portion of the back side of the first electronic device; and
when the back cover is coupled to the first electronic device and the flap is in the exposed configuration, the device support assembly of the back cover covers the first portion of the back side of the first electronic device, and the first camera lens at the second portion of the back side of the first electronic device is exposed and devoid of being covered by the exposure region of the flap.

4. The case of claim 3, wherein:
when the back cover is coupled to the second electronic device and the flap is in the closed configuration, the device support assembly of the back cover covers a first portion of a back side of the second electronic device, and the exposure region of the flap covers the second camera lens at a second portion of the back side of the second electronic device; and
when the back cover is coupled to the second electronic device and the flap is in the exposed configuration, the device support assembly of the back cover covers the first portion of the back side of the second electronic device, and the second camera lens at the second portion of the back side of the second electronic device is exposed and devoid of being covered by the exposure region of the flap.

5. The case of claim 1, wherein:
the flap folds relative to the main device region of the device support assembly along a flap hinge; and
the flap hinge extends from a first edge of the back cover to a second edge of the back cover.

6. The case of claim 5, wherein:
the first edge of the back cover is the top edge of the case; and
the second edge of the back cover is the back edge of the back cover.

7. The case of claim 5, wherein:
the first edge of the back cover is the top edge; and
the second edge of the back cover is the bottom edge of the case.

8. The case of claim 1, wherein:
the tab of the device support assembly comprises a first magnet;
the tab region of the flap comprises a second magnet; and
the first magnet is configured to magnetically couple with the second magnet to hold the flap in the closed configuration.

9. The case of claim 8, wherein:
the main device region of the device support assembly comprises a third magnet; and
the third magnet is configured to magnetically couple with the second magnet to hold the flap in the exposed configuration.

10. The case of claim 1, further comprising:
a spine located between the front cover and the back cover and extending between the top edge of the case and the bottom edge of the case,
wherein:
the spine comprises:
a first spine region located proximate to the top edge of the case; and
a second spine region located proximate to the bottom edge of the case;
the first spine region is configured to flexibly indent at the top edge of the case; and
the second spine region is configured to flexibly indent at the bottom edge of the case.

11. The case of claim 1, wherein:
the front cover comprises:
an outer segment comprising a fourth magnet;
a middle segment; and
an inner segment;
the back cover comprises a fifth magnet;
the front cover is configured to be folded in a triangular configuration such that the fourth magnet of the outer segment is magnetically coupled to the fifth magnet of the back cover; and
when the front cover is folded in the triangular configuration, the case is configured such that the flap can be folded from the closed configuration to the exposed configuration.

12. The case of claim 11, wherein:
the front cover further comprises a non-slip grip extending at least partially across the middle segment and extending at least partially across the inner segment.

13. The case of claim 11, wherein:
the fourth magnet of the outer segment is configured to magnetically couple with a sixth magnet in the first electronic device to hold the front cover in a closed cover configuration; and
when the front cover is in the closed cover configuration, the front cover covers a screen of the first electronic device.

14. The case of claim 11, wherein:
when the front cover is folded in the triangular configuration, the front cover is configured to support the case on a surface in a viewing configuration and a typing configuration;
when the case is in the viewing configuration, the inner segment of the front cover is placed on the surface to support the case; and
when the case is in the typing configuration, the back edge of the back cover and an inner hinge segment located between the inner segment and the middle segment of the front cover are placed on the surface to support the case.

15. The case of claim 1, wherein:
the device support assembly of the back cover comprises:
a side support proximate the back edge of the back cover;
a top corner support located proximate to a first corner at a back spine edge of the back cover and the top edge of the case; and
a bottom corner support located proximate to a second corner at the back spine edge of the back cover and the bottom edge of the case;
the back spine edge is located at the back cover opposite the back edge;
the top corner support is configured to elastically extend toward the first corner;
the bottom corner support is configured to elastically extend toward the second corner;
the side support, the top corner support, and the bottom corner support are configured to removably couple the first electronic device to the back cover; and
the side support, the top corner support, and the bottom corner support are configured to removably couple the second electronic device to the back cover when the first electronic device is not coupled to the back cover.

16. The case of claim 15, wherein:

the side support of the device support assembly comprises one or more non-slip pads.

17. The case of claim 1, further comprising:

at least one of the first electronic device or the second electronic device.

18. A method of providing a case, the method comprising:

providing a front cover; and providing a back cover comprising:

a back edge;

a device support assembly comprising a main device region and a tab; and a flap comprising an exposure region and a tab region, wherein:

the case comprises a top edge and a bottom edge;

the back cover is configured to be removably coupled to a first electronic device;

the back cover is configured to be removably coupled to a second electronic device when the first electronic device is not coupled to the back cover;

the first electronic device comprises a first camera lens and first dimensions;

the second electronic device comprises a second camera lens and second dimensions different from the first dimensions of the first electronic device; and the flap is configured to be placed in an exposed configuration and a closed configuration.

19. The method of claim 18, wherein:

providing the back cover comprises providing the back cover such that:

when the back cover is coupled to the first electronic device and the flap is in an exposed configuration, the first camera lens of the first electronic device is located at a first position relative to the back cover and the first camera lens of the first electronic device is exposed;

when the back cover is coupled to the second electronic device and the flap is in an exposed configuration, the second camera lens of the second electronic device is located at a second position relative to the back cover, the second camera lens of the second electronic device is exposed; and the first position is different from the second position.

20. The method of claim 18, wherein:

providing the back cover comprises providing the back cover such that:

the flap folds relative to the main device region of the device support assembly along a flap hinge; and the flap hinge extends from the top edge of the case to the back edge of the back cover.

21. The method of claim 18, wherein:

providing the back cover comprises providing the back cover such that:

the flap folds relative to the main device region of the device support assembly along a flap hinge; and the flap hinge extends from the top edge of the case to the bottom edge of the case.

\* \* \* \* \*